United States Patent
Lee et al.

(10) Patent No.: US 12,204,136 B2
(45) Date of Patent: Jan. 21, 2025

(54) OPTICAL COMBINER WITH UNIFORM ILLUMINANCE THROUGHPUT

(71) Applicant: Meta Platforms Technologies, LLC, Menlo Park, CA (US)

(72) Inventors: Yun-Han Lee, Redmond, WA (US); Lu Lu, Kirkland, WA (US); Mengfei Wang, Woodinville, WA (US); Fenglin Peng, Redmond, WA (US); Junren Wang, Kirkland, WA (US); Oleg Yaroshchuk, Kyiv (UA); Yingfei Jiang, Fremont, CA (US); Babak Amirsolaimani, Redmond, WA (US); Scott Charles McEldowney, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 145 days.

(21) Appl. No.: 17/901,851

(22) Filed: Sep. 2, 2022

(65) Prior Publication Data

US 2022/0413205 A1 Dec. 29, 2022

Related U.S. Application Data

(63) Continuation of application No. 16/666,823, filed on Oct. 29, 2019, now Pat. No. 11,467,331.

(51) Int. Cl.
*G03H 1/02* (2006.01)
*F21V 8/00* (2006.01)
*G02B 27/01* (2006.01)

(52) U.S. Cl.
CPC ....... *G02B 6/0036* (2013.01); *G02B 27/0172* (2013.01); *G03H 1/0248* (2013.01); *G02B 2027/0174* (2013.01); *G02B 2027/0178* (2013.01); *G03H 2260/12* (2013.01)

(58) Field of Classification Search
CPC .......... G02B 6/0036; G02B 6/10; G02B 1/00; G02B 27/0172; G02B 27/4261; G02B 2027/0174; G02B 2027/0178; G02B 5/1833; G03H 1/0248; G03H 2260/12; G03H 2260/51; G03H 2240/15; G03H 2240/53; G03H 2250/41
USPC .................................................. 359/3, 15, 34
See application file for complete search history.

(56) References Cited

U.S. PATENT DOCUMENTS

| | | | |
|---|---|---|---|
| 7,573,640 B2 * | 8/2009 | Nivon | G02B 27/102 359/630 |
| 2006/0291021 A1 | 12/2006 | Mukawa | |
| 2009/0303212 A1 | 12/2009 | Akutsu et al. | |
| 2014/0092373 A1 * | 4/2014 | Tabirian | G03F 7/20 355/71 |
| 2016/0363784 A1 | 12/2016 | Beaton et al. | |
| 2017/0373459 A1 | 12/2017 | Weng et al. | |
| 2018/0143485 A1 | 5/2018 | Oh | |

(Continued)

*Primary Examiner* — Jennifer D. Carruth
*Assistant Examiner* — Jyotsna V Dabbi
(74) *Attorney, Agent, or Firm* — MILLBURN IP PLLC

(57) ABSTRACT

A device includes a display configured to generate an image light. The device also includes a waveguide optically coupled with the display and configured to guide the image light to an exit pupil of the device. The waveguide includes a grating including a birefringent material, and a birefringence of the grating is configured to increase along a pupil-expanding direction of the device.

16 Claims, 11 Drawing Sheets

(56) References Cited

U.S. PATENT DOCUMENTS

| | | | |
|---|---|---|---|
| 2019/0056593 A1* | 2/2019 | Bablumyan | G02B 27/44 |
| 2019/0212588 A1* | 7/2019 | Waldern | G02B 27/0172 |
| 2019/0212596 A1* | 7/2019 | Waldern | G02B 1/04 |
| 2019/0227375 A1* | 7/2019 | Oh | G02F 1/133526 |
| 2020/0026074 A1 | 1/2020 | Waldern et al. | |
| 2020/0081398 A1 | 3/2020 | Yaroshchuk | |

* cited by examiner

Interference Exposure

Interference Exposure

OPTICAL COMBINER WITH UNIFORM ILLUMINANCE THROUGHPUT

CROSS REFERENCE TO RELATED APPLICATION

This application is a continuation of U.S. patent application Ser. No. 16/666,823, entitled "OPTICAL COMBINER WITH UNIFORM ILLUMINANCE THROUGHPUT," filed on Oct. 29, 2019. Content of the above-mentioned application is incorporated herein by reference in its entirety.

BACKGROUND

Augmented Reality (AR) headsets display a virtual image overlapping with real-world images or see-through images. Pupil-expansion waveguide displays with diffractive coupling structures are one of the most promising designs for AR displays, potentially offering sun/eye-glasses form factors, a moderately large field of view (FOV), and a large eye-box. A waveguide display system often includes a micro-display, collimator, and waveguide, which integrates an in-coupler and out-coupler. The waveguide expands the exit pupil along the direction of propagating light inside it. Uniform illuminance over the expanded exit pupil is highly desired for waveguide display systems maintaining a wide FOV.

SUMMARY OF THE DISCLOSURE

One aspect of the present disclosure provides an optical device. The optical device includes a display configured to generate an image light; and a waveguide optically coupled with the display and configured to guide the image light to an exit pupil of the optical device. The waveguide includes an in-coupling element configured to couple the image light into the waveguide, and an out-coupling element configured to decouple the image light out of the waveguide. The out-coupling element includes a grating having a diffraction efficiency gradient along a predetermined direction at a plane of the grating. The plane of the grating is perpendicular to a thickness direction of the grating.

Another aspect of the present disclosure provides a waveguide comprising an in-coupling element configured to couple a light into the waveguide, and an out-coupling element configured to decouple the light out of the waveguide. The out-coupling element includes a grating having a diffraction efficiency gradient along a predetermined direction at a plane of the grating.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure.

DETAILED DESCRIPTION

Figure 1A:
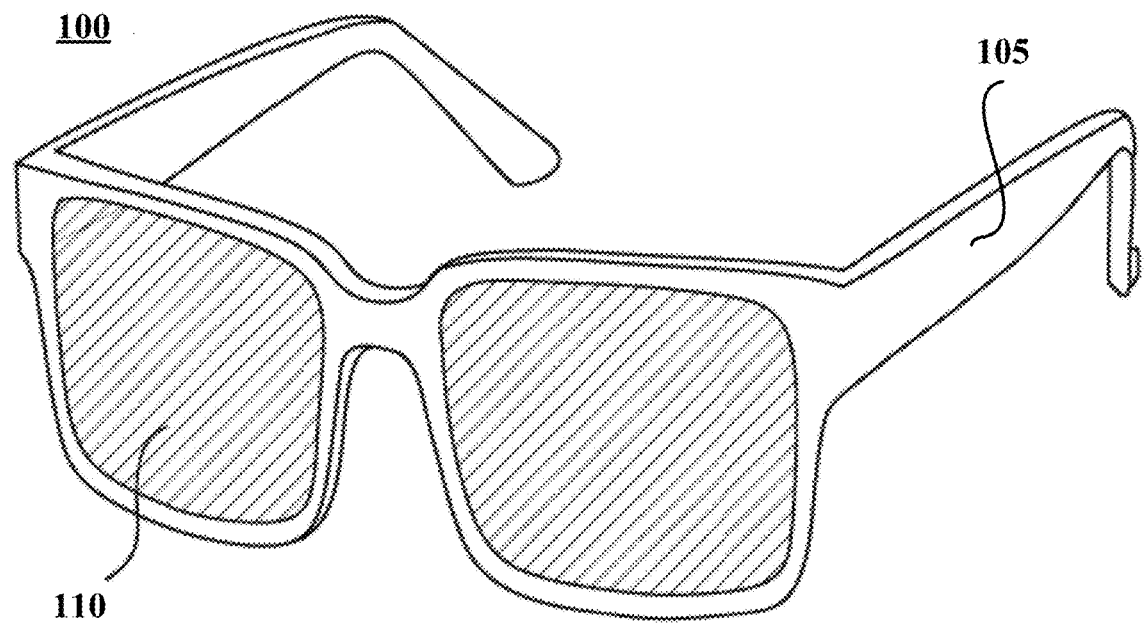
FIG. 1A illustrates a schematic diagram of a near-eye display (NED) according to an embodiment of the present disclosure.

Hereinafter, embodiments consistent with the disclosure will be described with reference to drawings, which are merely examples for illustrative purposes and are not intended to limit the scope of the disclosure. In the drawings, the shape and size may be exaggerated, distorted, or simplified for clarity. Wherever possible, the same reference numbers will be used throughout the drawings to refer to the same or like parts, and a detailed description thereof may be omitted. Further, in the present disclosure, the disclosed embodiments and the features of the disclosed embodiments may be combined under conditions without conflicts. The described embodiments are some but not all of the embodiments of the present disclosure. Based on the disclosed embodiments, persons of ordinary skill in the art may derive other embodiments consistent with the present disclosure, all of which are within the scope of the present disclosure.

A waveguide display system often includes a micro-display, collimator, and waveguide, which integrates an in-coupler and out-coupler. The waveguide expands the exit pupil along the direction of propagating light inside it. As the propagating light inside the waveguide is repeatedly diffracted by the out-coupler, with a portion of the light exiting the waveguide each time, the luminance of the exit light may decrease along an exit pupil-expanding direction. The present disclosure provides a waveguide display assembly providing a uniform illumination over the expanded exit pupils. The waveguide display assembly may be implemented into a near-eye display (NED). The waveguide display assembly may include a display configured to generate an image light and a waveguide optically coupled with the display and configured to guide the image light to an exit pupil of the optical device. The waveguide includes an in-coupling element configured to couple the image light into the waveguide, and an out-coupling element configured to decouple the image light out of the waveguide. The out-coupling element includes an out-coupling grating having a diffraction efficiency gradient along a predetermined direction. The predetermined direction is an exit pupil-expanding direction, along which the waveguide expands the exit pupil. The diffraction efficiency of the grating increases along the exit pupil-expanding direction.

The present disclosure also provides a grating fabrication method. The method includes dispensing a solution of a liquid crystalline polymer with a photo-cross-linkable mesogenic side group/chain in a solvent, on a substrate to form a film layer; exposing the film layer to an interference pattern having an intensity gradient along a first predetermined direction and treating the exposed film layer at an evaluated temperature. The first predetermined direction is in a plane of the film layer. The method further includes generating the interference pattern by two coherent polarized beams that are aligned in an angle. A spatial intensity profile of each polarized beam is shaped to have an intensity gradient along a second predetermined direction. The second predetermined direction is a beam diameter direction. A projection of the second predetermined direction on the plane of the film layer is parallel to the first predetermined direction.

FIG. 1A illustrates a schematic diagram of a near-eye display (NED) 100 according to an embodiment of the present disclosure. In some embodiments, the NED 100 may be referred to as a head-mounted display (HMD). The NED 100 may present media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 acts as a virtual reality (VR) device, an augmented reality (AR) device or a mixed reality (MR) device, or some combination thereof. In some embodiments, when the NED 100 acts as an augmented reality (AR) or a mixed reality (MR) device, portions of the NED 100 and its internal components may be at least partially transparent.

As shown in FIG. 1A, the NED 100 may include a frame 105 and a display 110. Certain device(s) may be omitted, and other devices or components may also be included. The frame 110 may include any appropriate type of mounting structure to ensure the display assembly 120 to be viewed as a NED by a user. The frame 105 may be coupled to one or more optical elements which together display media to users. In some embodiments, the frame 105 may represent a frame of eye-wear glasses. The display 110 is configured for users to see the content presented by the NED 100. As discussed below in conjunction with FIG. 1B, the display 110 may include at least one display assembly (not shown) for directing image light to an eye of the user.

Figure 1B:
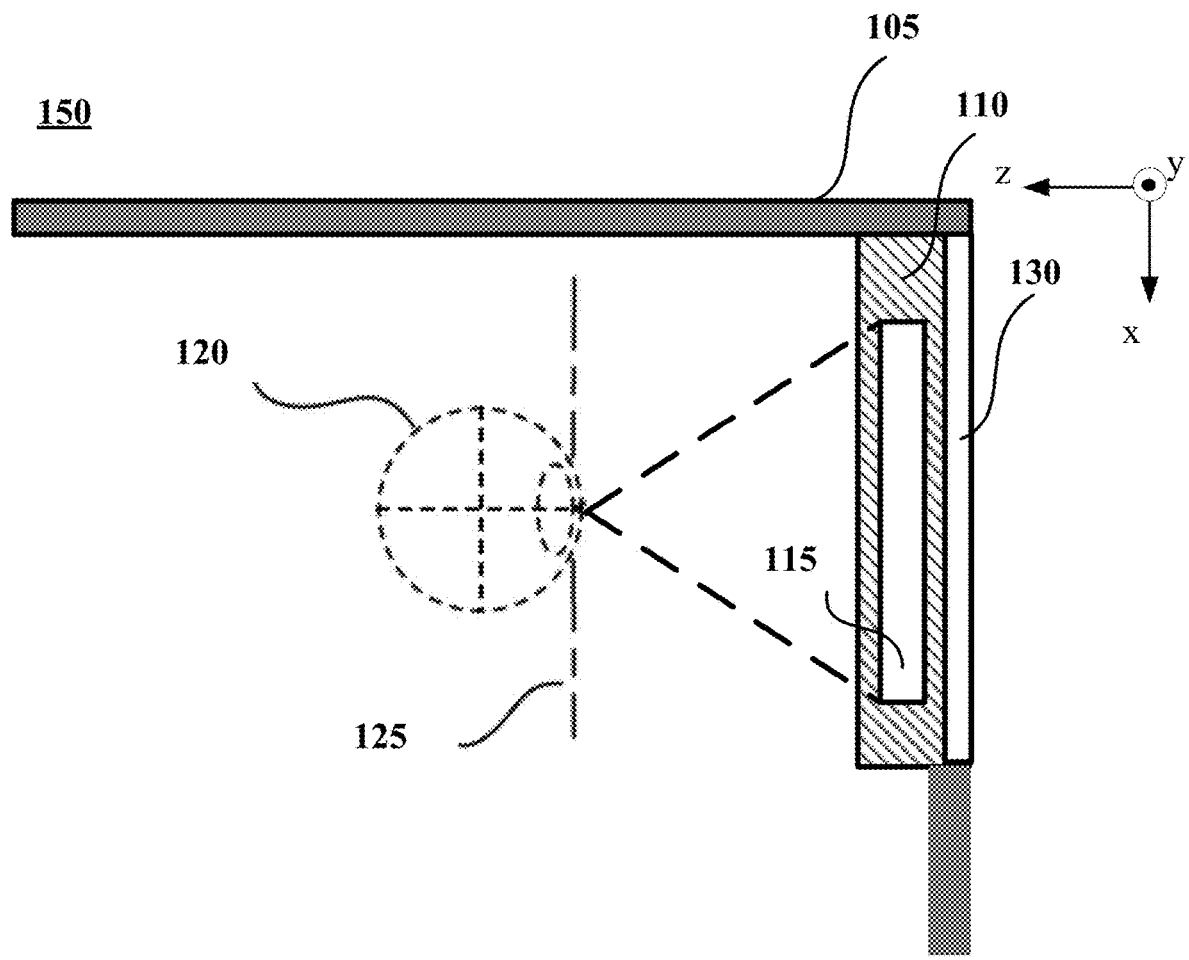
FIG. 1B illustrates a cross-section of the NED in FIG. 1A according to an embodiment of the present disclosure.

FIG. 1B is a cross-section 150 of the NED 100 shown in FIG. 1A according to an embodiment of the present disclosure. The display 110 may include at least one waveguide display assembly 115. An exit pupil 305 may be a location where the eye 120 is positioned in an eye-box region when the user wears the NED 100. For purposes of illustration, FIG. 1B shows the cross section 150 associated with a single eye 120 and a single waveguide display assembly 115, but in alternative embodiments not shown, another display assembly which is separate from the waveguide display assembly 115 shown in FIG. 1B, may provide image light to an eye-box located at an exit pupil of another eye of the user.

The waveguide display assembly 115, as illustrated below in FIG. 1B, is configured to direct the image light to an eye-box located at the exit pupil 305 of the eye 120. The waveguide display assembly 115 may be composed of one or more materials (e.g., plastic, glass, etc.) with one or more refractive indices that effectively minimize the weight and widen a field of view (FOV) of the NED 100. In some embodiments, the waveguide display assembly 115 may be a component (e.g., the display 110) of the NED 100. In some embodiments, the waveguide display assembly 115 may be part of some other NED, or other system that directs display image light to a particular location. As shown in FIG. 1B, the waveguide display assembly 115 may be for one eye 120 of the user. The waveguide display assembly 115 for one eye may be separated or partially separated from the waveguide display assembly 115 for the other eye. In certain embodiments, a single waveguide display assembly 115 may be used for both eyes 120 of the user.

In some embodiments, the NED 100 may include one or more optical elements between the waveguide display assembly 115 and the eye 120. The optical elements may act to, e.g., correct aberrations in image light emitted from the waveguide display assembly 115, magnify image light emitted from the waveguide display assembly 115, some other optical adjustment of image light emitted from the waveguide display assembly 115, or some combination thereof. The example for optical elements may include an aperture, a Fresnel lens, a convex lens, a concave lens, a filter, or any other suitable optical element that affects image light. In some embodiments, the NED 100 may include an adaptive dimming system 130, which includes a dimming element. The dimming element may dynamically adjust the transmittance of the real-world objects viewed through the NED 100, thereby switching the NED 100 between a VR device and an AR device or between a VR device and a MR device. In some embodiments, along with switching between the AR/MR device and the VR device, the dimming element may be used in the AR device to mitigate difference in brightness of real and virtual objects. Exemplary waveguide display assembly 115 will be described in detail below in conjunction with FIG. 2 and FIG. 3.

Figure 2:
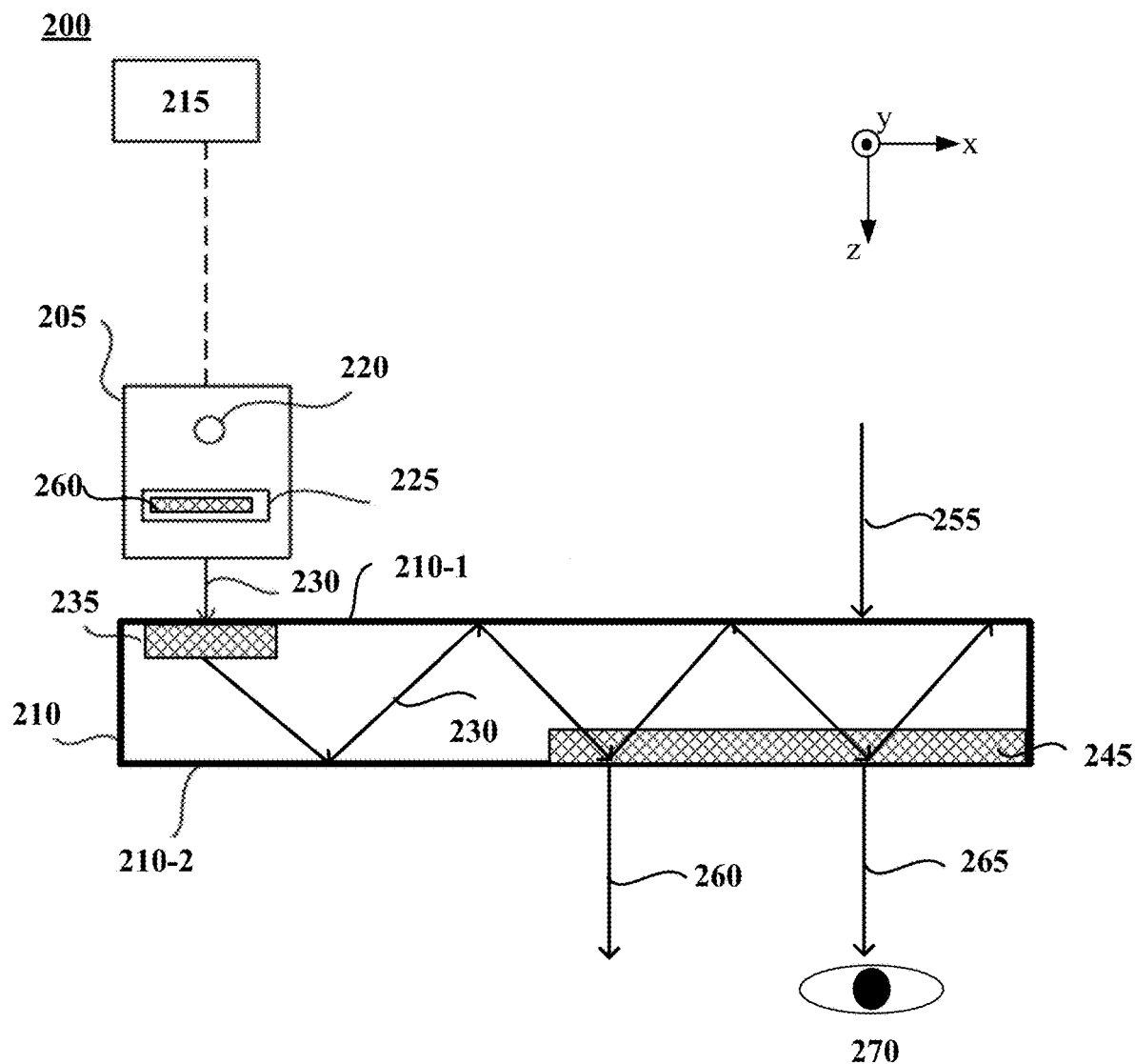
FIG. 2 illustrates a schematic diagram of a waveguide display assembly, according to an embodiment of the present disclosure.

FIG. 2 illustrates a schematic diagram of a waveguide display assembly 200 of the HMD in FIG. 1A according to an embodiment of the present disclosure. The waveguide display assembly 200 may be the waveguide display assembly 115 in FIG. 1B. As shown in FIG. 2, the waveguide display assembly 200 may include a source assembly 205, a waveguide 210, and a controller 215. The source assembly 205 may include a source 220 and an optics system 225. The source 220 may be a light source that generates coherent or partially coherent light. The source 220 may include, e.g., a laser diode, a vertical cavity surface emitting laser, and/or a light emitting diode. In some embodiments, the source 220 may be a display panel, such as a liquid crystal display (LCD) panel, a liquid-crystal-on-silicon (LCoS) display panel, an organic light-emitting diode (OLED) display panel, a micro-LED (micro light-emitting diode) display panel, a digital light processing (DLP) display panel, or some combination thereof. In some embodiments, the source 220 may be a self-emissive panel, such as an OLED display panel or a micro-LED display panel. In some embodiments, the source 220 may be a display panel that is illuminated by an external source, such as an LCD panel, an LCoS display panel, or a DLP display panel. Examples of an external sources may include a laser, an LED, an OLED, or some combination thereof. The optics system 225 may include one or more optical components that condition the light from the source 220. Conditioning light from the source 220 may include, e.g., transmitting, attenuating, expanding, collimating, and/or adjusting orientation in accordance with instructions from the controller 215.

The source assembly 205 may generate image light 230 and output the image light 230 to an in-coupling element 235 located at the waveguide 210. The waveguide 210 may receive the image light 230 at one or more in-coupling elements 235, and guide received image light 230 to an out-coupling element 245 located at the waveguide 210, such that the received input image light 230 is decoupled out of the waveguide 210 via the out-coupling element 245 towards an eye 270 of the user. The waveguide 210 may include a first surface 210-1 facing the real-world and an opposing second surface 210-2 facing the eye 270. The in-coupling element 235 may be part of, or affixed to, the first surface 210-1 or the second surface 210-2 of the waveguide 210. In some embodiments, as shown in FIG. 2, the in-coupling element 235 may be part of, or affixed to, the first surface 210-1 of the waveguide 210. In some embodiments, the in-coupling element 235 may be part of, or affixed to, the second surface 210-2 of the waveguide 210. In some embodiments, the in-coupling element 235 may include a surface relief grating, a volume hologram, a polarization grating, a polarization volume hologram, a metasurface grating, or other types of diffractive elements, or some combination thereof. In some embodiments, the in-coupling element 235 may include a diffraction grating, and a pitch of the diffraction grating may be chosen such that the total internal reflection occurs in the waveguide 210, and the image light 230 may propagate internally in the waveguide 210 (e.g., by total internal reflection) along the direction of propagating light inside the waveguide 210 (e.g., +x-axis direction in FIG. 2). The in-coupling element 235 is also referred to as an in-coupling grating.

The out-coupling element 245 may be part of, or affixed to, the first surface 210-1 or the second surface 210-2 of the waveguide 210. In some embodiments, as shown in FIG. 2, the out-coupling element 245 may be part of, or affixed to, the first surface 210-1 of the waveguide 210. In some embodiments, the out-coupling element 245 may be part of, or affixed to, the second surface 210-2 of the waveguide 210. In some embodiments, the out-coupling element 245 may include a surface relief grating, a volume hologram, a polarization grating, a polarization volume hologram (PVH), a metasurface grating, or other types of diffractive elements, or some combination thereof. In some embodiments, the out-coupling element 245 may include a diffraction grating, and the pitch of the diffraction grating may be configured to cause the incident image light 230 to exit the waveguide 210, i.e. redirecting image light 230 so that total internal reflection no longer occurs. Such a grating is also referred to as an out-coupling grating.

That is, the in-coupling element 235 may redirect the image light 230 from the source assembly 205 at total internal reflection (TIR) along the direction of propagating light inside the waveguide 210 (e.g., +x-axis direction in FIG. 2), and the out-coupling element 245 may redirect the internally propagating image light 230 towards the eye 270 of the user. Because there is still light propagating within the waveguide 210 after the initial extraction by the out-coupling element 245 (e.g., an initial extracted light 260), further extractions may be possible (e.g., a second extracted light 265), which expands the exit pupil of the NED. The direction of propagating light inside the waveguide 210 (e.g., +x-axis direction in FIG. 2) is also referred to as an exit pupil-expanding direction or pupil-expanding direction for short.

Figure 3:
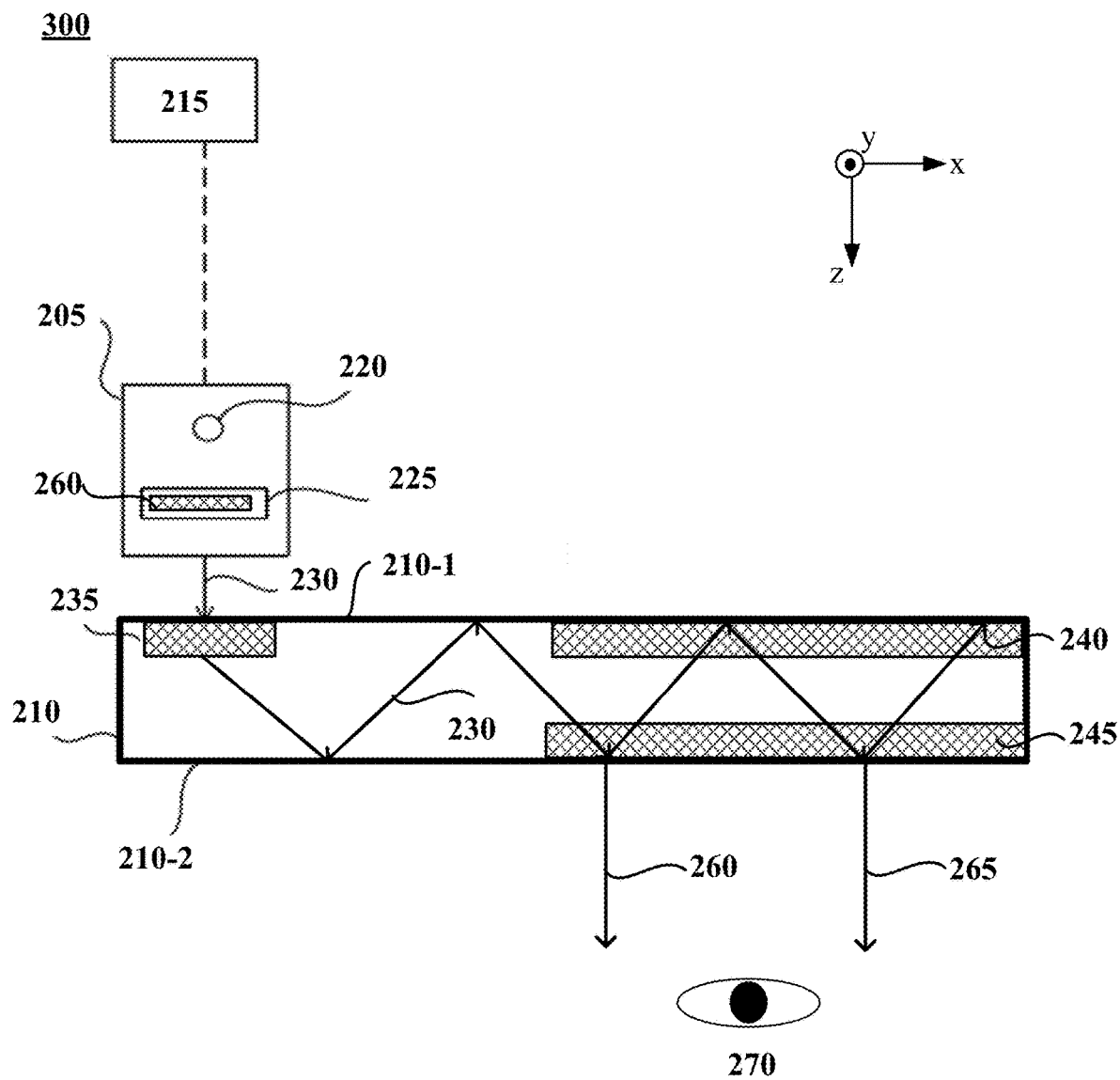
FIG. 3 illustrates a schematic diagram of another waveguide display assembly, according to an embodiment of the present disclosure.

In some embodiments, the waveguide display assembly 200 may include additional gratings that redirect/fold and/or expand the pupil of the source assembly 205. In some embodiments, multiple functions, e.g., redirecting/folding and/or expanding the pupil of the source assembly 205 may be combined into a single grating, e.g. an out-coupling grating. In some embodiments, some above-mentioned gratings may be divided in several sections (subgratings), for example for tiling field of view (FOV). In some embodiments, the waveguide display assembly 200 may include more than one out-coupling elements, such as more than one out-coupling gratings, for example, for tiling FOV or for outcoupling parts of images corresponding to different colors. For example, as shown in FIG. 3, a waveguide display assembly 300 may further include a directing element 240 that redirects the received input image light 230 to the out-coupling element 245, such that the received input image light 230 is decoupled out of the waveguide 210 via the out-coupling element 245. The directing element 240 may be part of, or affixed to, the first side 210-1 of the waveguide 210, and the out-coupling element 245 may be part of, or affixed to, the second side 210-2 of the waveguide 210, such that the directing element 240 is arranged opposed to the out-coupling element 245. In some embodiments, the directing element 240 and the out-coupling element 245 may be structurally similar. The directing element 240 may include a surface relief grating, a volume hologram, a polarization grating, a polarization volume hologram, a metasurface grating, or other types of diffractive elements or some combination thereof. In some embodiments, the directing element 240 may be a diffraction grating, and in this case the directing element 240 is also referred to as a folding grating.

Returning to FIG. 2, the waveguide 210 may be composed of one or more materials that facilitate total internal reflection of the image light 230. The waveguide 210 may be composed of, for example, plastic, glass, and/or polymers, or some combination thereof. The waveguide 210 may have a relatively small form factor. For example, the waveguide 210 may be about 50 mm wide along the x-dimension, 30 mm long along the y-dimension and 0.5-1 mm thick along the z-dimension. In some embodiments, the waveguide display assembly 200 may include a stack of waveguides, where each waveguide is designed to handle, e.g., some portion of the FOV and color spectrum of the virtual image.

The controller 215 may control the operations of the source assembly 205, and determine scanning instructions for the source assembly 205. In some embodiments, the waveguide 210 may output the expanded image light 230 to the eye 270 with a large FOV. For example, the expanded image light 230 may be provided to the eye 270 with a diagonal FOV (in x and y) of 60 degrees and or greater and/or 120 degrees and/or less. The waveguide 210 may be configured to provide an eye-box with a width of 12 mm or greater and/or equal to or less than 50 mm, and/or a height of 8 mm or greater and/or equal to or less than 20 mm. When the NED is used for AR or MR applications, in addition to the image light 230, light 255 from a real-world environment may be transmitted through the waveguide 210 to be incident into the eye 270.

In some embodiments, the waveguide display assembly 200 may include a plurality of source assemblies 205 and a plurality of waveguides 210. Each of the source assemblies 205 may emit a monochromatic image light of a specific wavelength band corresponding to a primary color (e.g., red, green, or blue). Each of the waveguides 210 may be stacked together with a distance of separation to output an expanded image light 230 that is multi-colored. Using the waveguide display assembly 200, the physical display and electronics may be moved to the side of the front rigid body and a fully unobstructed view of the real world may be achieved, therefore opening up the possibilities to true AR experiences.

To provide substantially uniform illumination over the expanded exit pupil, the out-coupling element 245 or at least one of the out-coupling elements may be configured to have an out-coupling efficiency gradient along the pupil-expanding direction or the direction of propagating light inside the waveguide 210, e.g., +x-axis direction in FIG. 2. The out-coupling efficiency of the out-coupling element 245 may gradually increase along the pupil-expanding direction, such that the luminance decrease of the extracted light along the pupil-expanding direction may be compensated, and a uniform illuminance over the expanded exit pupil may be realized accordingly. That is, a uniform image brightness throughout may be achieved over the expanded exit pupil.

In some embodiments, the out-coupling element 245 may include a polarization volume hologram (PVH) that is a grating with three-dimensional (3D) orientational pattern, which is a circular polarization sensitive grating. The PVH grating may be made of birefringent materials that include a plurality of liquid crystal (LC) materials with intrinsic orientational order, which can be locally controlled. These liquid crystal materials include conventional LC responsive to an electric field, reactive mesogens that are polymerizable liquid crystal materials, and/or liquid crystal polymers. Besides, the suitable materials may include materials in which orientational order is missing in an initial state but can be induced by a polarized light. These materials may include some classes of photosensitive amorphous polymers, low molecular weight materials and even some biomaterials like bacteriorhodopsin in which efficiency of photochemical reaction depends on polarization of exciting light that results in photoinduced orientational ordering.

The PVH grating may be configured to diffract the incident image light 230 via Bragg diffraction. The light may be primarily reflected forward by a transmissive PVH grating, and primarily reflected backwards by a reflective PVH grating. A PVH may be categorized into a left-handed and a right-handed PVH. For example, a left-handed PVH may diffract a left-handed circularly polarized (LCP) light and not affect a right-handed circularly polarized (RCP) light, while a right-handed PVH may diffract an RCP light and not affect an LCP light. Note an unpolarized light as well as a linearly polarized light can be decomposed into an LCP light and an RCP light. In some embodiments, depending on the alignment pattern of the anisotropic molecules in the PVH, the PVH may have some optical power and so further converge or diverge the incident light.

In the disclosed embodiments, the PVH may be configured to have a diffraction efficiency gradient along the pupil-expanding direction, e.g., +x-axis direction in FIG. 2. The diffraction efficiency of the PVH may gradually increase along the pupil-expanding direction, such that a uniform illuminance over the expanded exit pupil may be realized. In some embodiments, the PVH may be fabricated by processing a liquid crystalline polymer with photo-cross-linkable mesogenic side groups, where a large optical anisotropy may be generated by irradiating with polarized light beam (e.g., UV, violet or blue) and subsequent annealing at some temperature from the range of LC mesophase. After irradiating with polarized light beam, the mesogenic side groups may be cross-linked. In some embodiments, the above specified liquid crystalline polymer may include polymethacrylate or polyacrylate main chains and cinnamate containing side chains.

Figure 11:
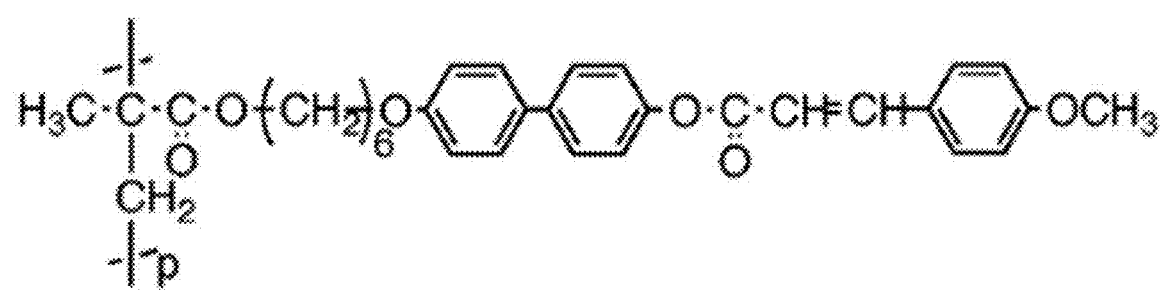
FIG. 11 illustrates a chemical formula for Polymethacrylate with 4-(4-methoxycinnamoyloxy) biphenyl side groups.

In some embodiments, the PVH may be fabricated from a polymethacrylate with 4-(4-methoxycinnamoyloxy) biphenyl (MCB) side groups that exhibit an efficient in-plane molecular orientation. Polymethacrylate with 4-(4-methoxycinnamoyloxy) biphenyl side groups may have a chemical formula shown in FIG. 11. This material is referred to as M1 in the following description. Through adding suitable photosensitizers activated by violet or blue light to a M1 film and irradiating the M1 film with a polarized light beam (e.g., UV, violet or blue light), an optical anisotropy due to an axis-selective photo-cross-linking reaction may be induced. Further, the photoinduced optical anisotropy may be enhanced by a subsequent annealing. The photoinduced optical anisotropy of the M1 film or the photoinduced birefringence as a measure of this anisotropy may be a function of exposure energy. It is to be noted that, here the material M1 is for illustrative purposes, and is not intended to limit the scope of the present disclosure. The dependence of the photoinduced birefringence on exposure energy is similar for other materials from liquid crystalline polymers of M series. Liquid crystalline polymers of M series are discussed in U.S. patent application Ser. No. 16/433,506, filed on Jun. 17, 2019, titled "Photosensitive Polymers for Volume Holography," which is incorporated by reference for all purposes.

Figure 4:
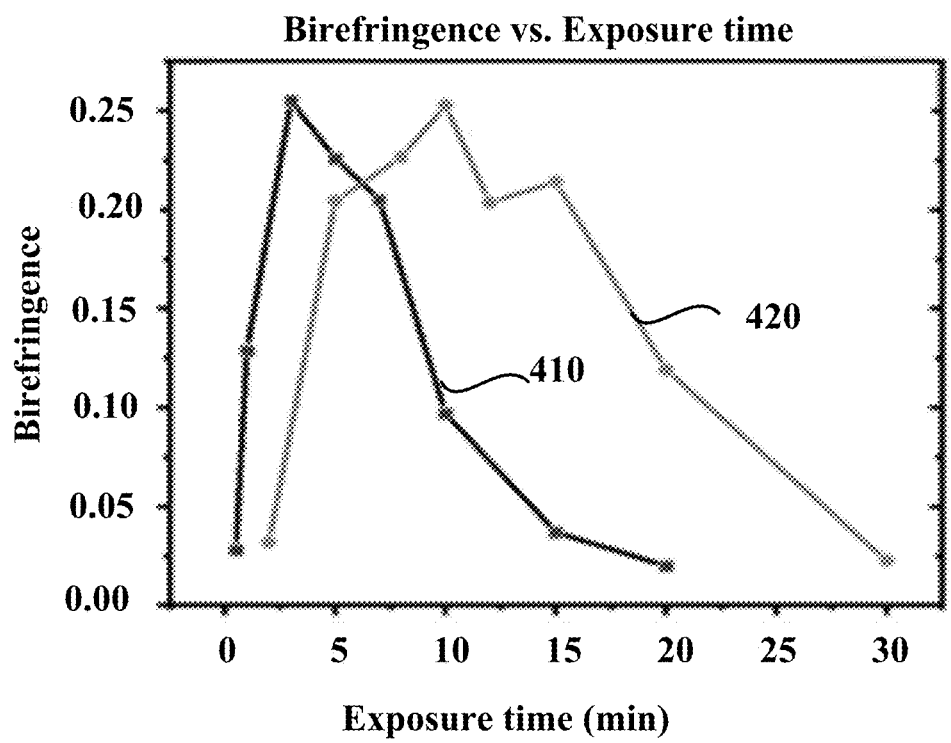
FIG. 4 illustrates a relationship between a photoinduced birefringence ($\Delta np$) and exposure time of two films of material M1 with different thickness, according to an embodiment of the present discourse.

FIG. 4 illustrates a relationship between an induced birefringence and exposure time of two films of polymer M1 with different thickness, according to an embodiment of the present discourse. The M1 film is prepared by dispensing (e.g., by spin coating) a solution of M1 in a suitable solvent, for example, chloroform (CHCl3), on a substrate to form a spin-coated film, irradiating a linearly polarized light beam (e.g., UV light) on the spin-coated film to induce an optical anisotropy, and heat treating (e.g., annealing) the irradiated film to enhance the photoinduced optical anisotropy. As shown in FIG. 4, the horizontal and vertical axes represent the exposure time t (unit: min) and the photoinduced birefringence, respectively. Curves 410 and 420 show experimentally measured photoinduced birefringence ($\Delta n_p$) vs. exposure time of a 0.15-μm-thick M1 film and a 1.6-μm-thick M1 film, respectively. The linearly polarized light beam has a wavelength of about 365 nm, and the exposure intensity is about 9 mW/cm$^2$. The annealing of the film after the interference exposure lasts for about 10 mins at a temperature of about 180° C.

As shown by the curve 410 in FIG. 4, the 0.15-μm-thick M1 film does not exhibit an obvious photoinduced birefringence at the very beginning of the exposure. As the exposure time gradually increases from 1 min to 3 mins, the photoinduced birefringence $\Delta n_p$ of the 0.15-μm-thick M1 film substantially increases in a relatively fast speed to a peak of about 0.255 at t=3 mins. As the exposure time further increases, the photoinduced birefringence of the 0.15-μm-thick M1 film gradually decreases from the peak value of about 0.255. For example, the photoinduced birefringence of the 0.15-μm-thick M1 film is about 0.225 at t=5 mins, about 0.20 at t=7.5 mins, about 0.10 at t=10 mins, about 0.03 at t=15 mins and about 0.02 at t=20 mins. That is, as the exposure time keeps increasing, the photoinduced birefringence $\Delta n_p$ of the 15-µm-thick M1 film gradually increases to a peak value at t=3 mins then gradually decreases.

As shown by the curve 420 in FIG. 4, the 1.6-µm-thick M1 film does not exhibit an obvious photoinduced birefringence $\Delta n_p$ at the very beginning of the exposure. As the exposure time gradually increases from 2 min to 10 mins, the photoinduced birefringence $\Delta n_p$ of the 1.6-µm-thick M1 film gradually increases to a maximal value of about 0.25 at t=10 mins. The photoinduced birefringence $\Delta n_p$ of the 1.6-µm-thick M1 film substantially increases to about 0.2 at t=5 mins from t=3 mins in a relative fast speed, and substantially increases to its maximal value of about 0.25 at t=10 mins from t=5 mins in a relative slow speed. As the exposure time further increases, the photoinduced birefringence $\Delta n_p$ of the 1.6-µm-thick M1 film gradually decreases from the maximal value of about 0.25 at t=10 mins to about 0.02 at t=30 mins.

The curves 410 and 420 show that as the exposure time increases, the photoinduced birefringence $\Delta n_p$ of the M1 film have a trend to first gradually increase to a maximal value, then gradually decrease to almost zero. Such a tendency does not depend on the film thickness, but for a thicker M1 film, a higher radiation (e.g., a longer exposure time shown in FIG. 4 when the exposure intensity is constant) may be desired to achieve a maximal value and further decrease of the photoinduced birefringence $\Delta n_p$. That is, to obtain the same photoinduced birefringence $\Delta n_p$ in M1 films with different thickness, the exposure time may vary when the exposure intensity is constant. For an M1 film with a given thickness, the photoinduced birefringence $\Delta n_p$ of the M1 film depends on the exposure time when the exposure intensity is constant. Thus, a photoinduced birefringence ($\Delta n_p$) gradient across the M1 film in a predetermined direction at a plane of the M1 film may be attainable by varying the exposure time of the M1 film in the predetermined direction. One skilled in the art can understand the exposure energy (unit: mJ/cm$^2$) received by the M1 film may be related to the exposure time (unit: min) and exposure intensity (unit: mW/cm$^2$). Under given exposure intensity, the exposure energy received by the M1 film may be proportional to the exposure time. Under given exposure time, the exposure energy received by the M1 film may be proportional to the exposure intensity. One skilled in the art can further understand that when the exposure time is the same at different portions of the M1 film, a photoinduced birefringence ($\Delta n_p$) gradient across the M1 film in the predetermined direction at the plane of the M film may be attainable by varying the exposure intensity of the M1 film in the predetermined direction. That is, a photoinduced birefringence ($\Delta n_p$) gradient across the M1 film in the predetermined direction at the plane of the M film may be attainable by varying the exposure time and/or exposure intensity of the M1 film in the predetermined direction.

In the following, the diffraction efficiency of a PVH grating made of M1 is evaluated for different film thickness and different birefringence $\Delta n$ of the PVH. In some embodiments, to fabricate a PVH grating using M1, a solution of M1 in a solvent (e.g., chloroform (CHCl3)) may be dispensed (e.g., spin coated) on a substrate to form a spin-coated film of M1. The spin-coated film of M1 may be subjected to an interference exposure of two polarized beams of coherent light to induce an optical anisotropy pattern, then heat treated (e.g., annealed) to enhance the photoinduced optical anisotropy. In some embodiments, the interference exposure of two beams of polarized light may be generated in a following way: the beam of linearly polarized light (e.g., UV or violet light) from a light source may be split into two paths with a non-polarizing beam splitter (NPBS), then the split parts may be transmitted through corresponding quarter-wave plates (QWP) to generate two opposite-handed circularly polarized beams. These two beams may be converged on the spin-coated film of M1 to generate an interference pattern and record birefringence patterns in M1. The birefringence $\Delta n$ of the PVH may be the photoinduced birefringence $\Delta n_p$ of the M1 film enhanced by annealing in LC mesophase. It is to be noted that the spin-coated film of M1 may be subjected to an interference pattern with a uniform or nonuniform intensity in a direction at a plane of the M1 film, depending on different application scenarios.

Figure 5:
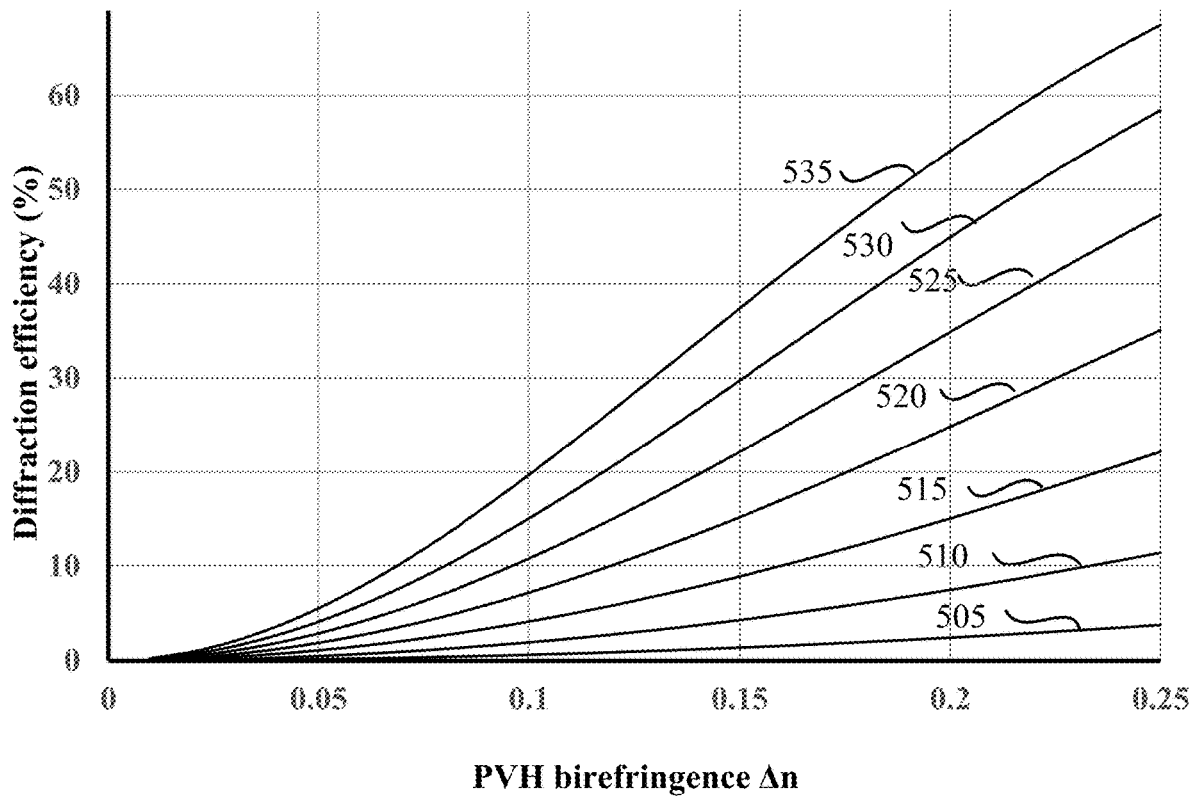
FIG. 5 illustrates simulation results of birefringence ($\Delta n$) dependent diffraction efficiency of polarization volume hologram (PVH) gratings with different thickness, according to an embodiment of the present disclosure.

FIG. 5 illustrates simulation results of birefringence dependent diffraction (coupling) efficiency of PVHs with different film thickness. As shown in FIG. 5, the horizontal axis and vertical axis represent the PVH birefringence $\Delta n$ and the diffraction efficiency for a normally incident LCP light, respectively. Curves 505-535 show the diffraction efficiency of seven PVHs having a thickness of about 0.1 µm, 0.2 µm, 0.3 µm, 0.4 µm, 0.5 µm, 0.6 µm, and 0.7 µm, respectively. As shown in FIG. 5, when the thickness of the PVH is uniform cross the PVH, the diffraction efficiency of the PVH for a normally incident LCP light may gradually increase as the PVH birefringence $\Delta n$ increases. For example, as indicated by the curve 520, for a normally incident LCP light, the PVH having a film thickness of 0.4 µm may increase from about zero to about 35% as the birefringence $\Delta n$ increases from about zero to about 0.25. Thus, the diffraction efficiency of the PVH may be controllable through controlling the birefringence $\Delta n$ of the PVH. A diffraction efficiency gradient across the PVH in a predetermined direction in a plane of the PVH may be attainable by configuring a PVH birefringence gradient across the PVH in the predetermined direction. That is, a PVH birefringence gradient vector may determine a diffraction efficiency gradient vector of the PVH. In addition, as the PVH birefringence $\Delta n$ increases, the angular bandwidth and spectral bandwidth of a transmissive PVH grating may increase.

Further, as indicated by the curves 505-535, for a given PVH birefringence $\Delta n$, the diffraction efficiency of the PVH may increase as the film thickness increases. For example, when the PVH birefringence $\Delta n$ is about 0.25, the diffraction efficiency of the PVH is about 4%, 11%, 22%, 35%, 48%, 58% and 65% for the PVHs having a thickness of about 0.1 µm, 0.2 µm, 0.3 µm, 0.4 µm, 0.5 µm, 0.6 µm, and 0.7 µm, respectively. Thus, the diffraction efficiency of the PVH may be controllable through controlling the thickness of the PVH. A diffraction efficiency gradient across the PVH in the predetermined direction at the plane of the PVH may be attainable by configuring the film thickness across the PVH in the predetermined direction.

According to FIG. 5, a diffraction efficiency gradient across the PVH in a predetermined direction at the plane of the PVH may be attainable by varying the PVH birefringence $\Delta n$ and/or the film thickness of the PVH in the predetermined direction. In some embodiments, a PVH grating in accordance with an embodiment of the present discourse may be implemented as the out-coupling element 245 of the waveguide display assembly shown in FIG. 2 and FIG. 3, and a gradient vector of the diffraction efficiency of (or a diffraction efficiency gradient vector) of the PVH grating may be oriented to be parallel to a desired pupil-expanding direction of the waveguide display assembly, e.g., +x-axis direction in FIG. 2 and FIG. 3.

Figure 6:
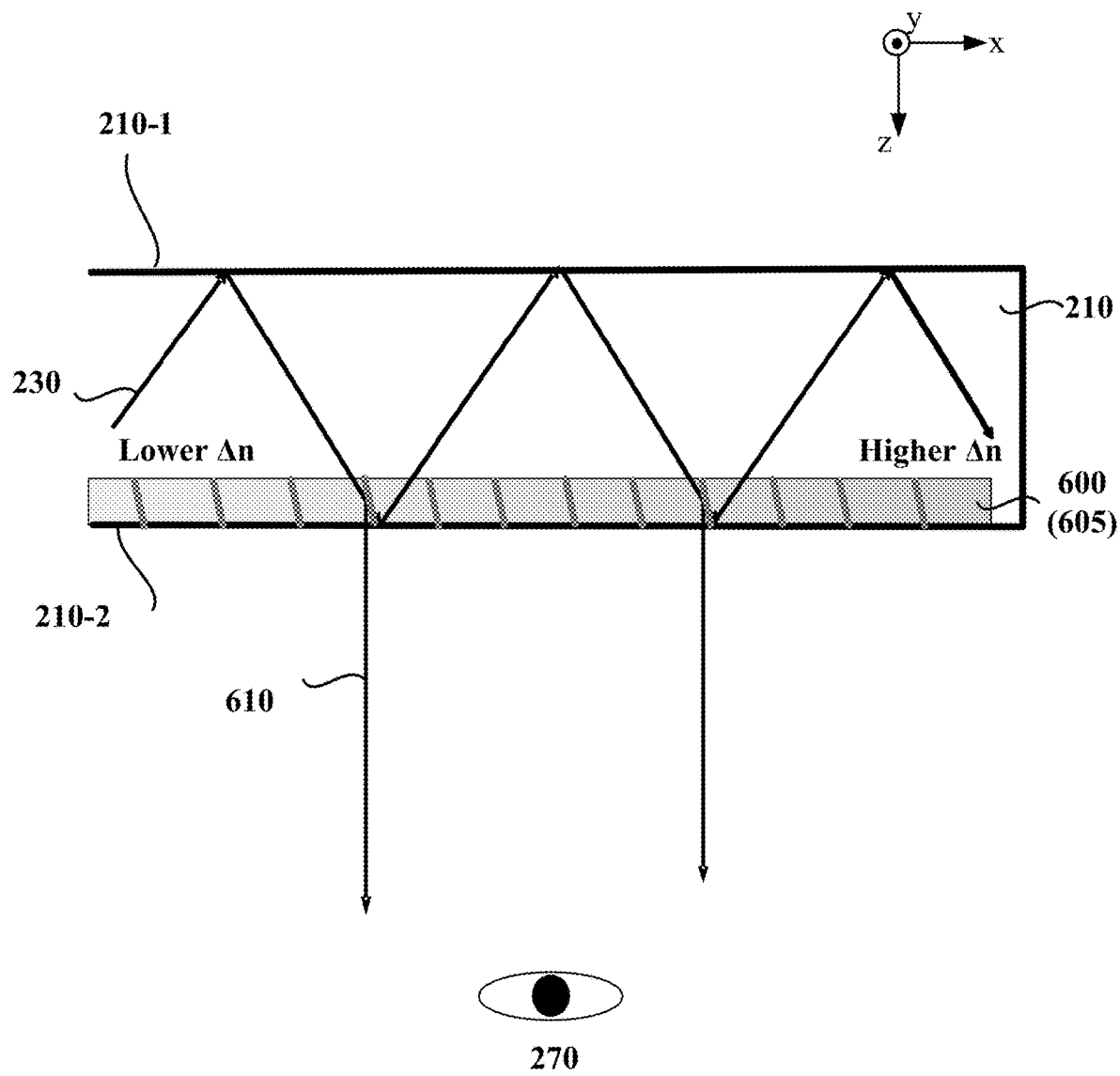
FIG. 6 illustrates a schematic diagram of a PVH grating having a diffraction efficiency gradient implemented in a waveguide display assembly, according to an embodiment of the present disclosure.

FIG. 6 illustrates a schematic diagram of a PVH grating 600 implemented into a waveguide display assembly according to an embodiment of the present disclosure. The PVH grating 600 may be an embodiment of the out-coupling element 245 in FIG. 2. The diffraction efficiency gradient vector of the PVH grating 600 may be orientated to be along a desired pupil-expanding direction, e.g., +x-axis direction in FIG. 2 and FIG. 6, which may be attainable by orienting a PVH birefringence gradient vector along the pupil-expanding direction because the diffraction efficiency gradient vector is determined by the PVH birefringence gradient vector. For easy description, FIG. 6 only shows partial structure of the waveguide display assembly, and the detail structure of the waveguide display assembly can be referred to FIGS. 2-3.

As shown in FIG. 6, the PVH grating 600 may include a transmissive PVH 605 fabricated from the material M1. In some embodiments, the PVH grating 600 may be the PVH 605. The PVH 605 may have a uniform thickness. The PVH 605 may have a PVH birefringence gradient vector in a predetermined direction in a plane of the PVH 605, and the PVH birefringence gradient vector may be orientated relative to a desired pupil-expanding direction of the waveguide display assembly, such that a desired direction of pupil expansion may be provided. In some embodiments, the PVH birefringence gradient vector may be orientated parallel to a desired pupil-expanding direction of the waveguide display assembly, e.g., the desired pupil-expanding direction is in +x-axis direction in FIG. 6. Thus, the diffraction efficiency gradient vector of the PVH grating 600 may be oriented parallel to the pupil-expanding direction of the waveguide display assembly. That is, when the PVH birefringence Δn of the PVH 605 gradually increases along the pupil-expanding direction, the diffraction efficiency of the PVH grating 600 may also increase accordingly along the pupil-expanding direction of the waveguide display assembly. Thus, the luminance decrease of extracted light 610 via diffraction along the pupil-expanding direction may be compensated, and a uniform illuminance over the expanded exit pupil may be realized accordingly. That is, a uniform image brightness throughout may be achieved over the expanded exit pupil, and the user may observe images with uniform brightness.

Further, the PVH birefringence gradient vector may be parallel to a projection of a grating vector of the PVH 605 on the plane of the PVH 605. When implementing the PVH 605 in the waveguide display assembly, the projection of the grating vector of the PVH 605 on the plane of the PVH 605 may be orientated parallel to a desired pupil-expanding direction of the waveguide display assembly and, accordingly, the PVH birefringence gradient vector may be orientated parallel to the desired pupil-expanding direction of the waveguide display assembly. For example, as FIG. 6 shows, the PVH 605 may be a slanted grating, the plane of the PVH 605 may be the x-y plane that is perpendicular to a thickness direction of the PVH 605, and the desired pupil-expanding direction is in +x-axis direction. The projection of the grating vector of the PVH grating 600 on the x-y plane may be orientated parallel to the +x-axis and, accordingly, the PVH birefringence gradient vector may be orientated parallel to the +x-axis.

Figure 7A:
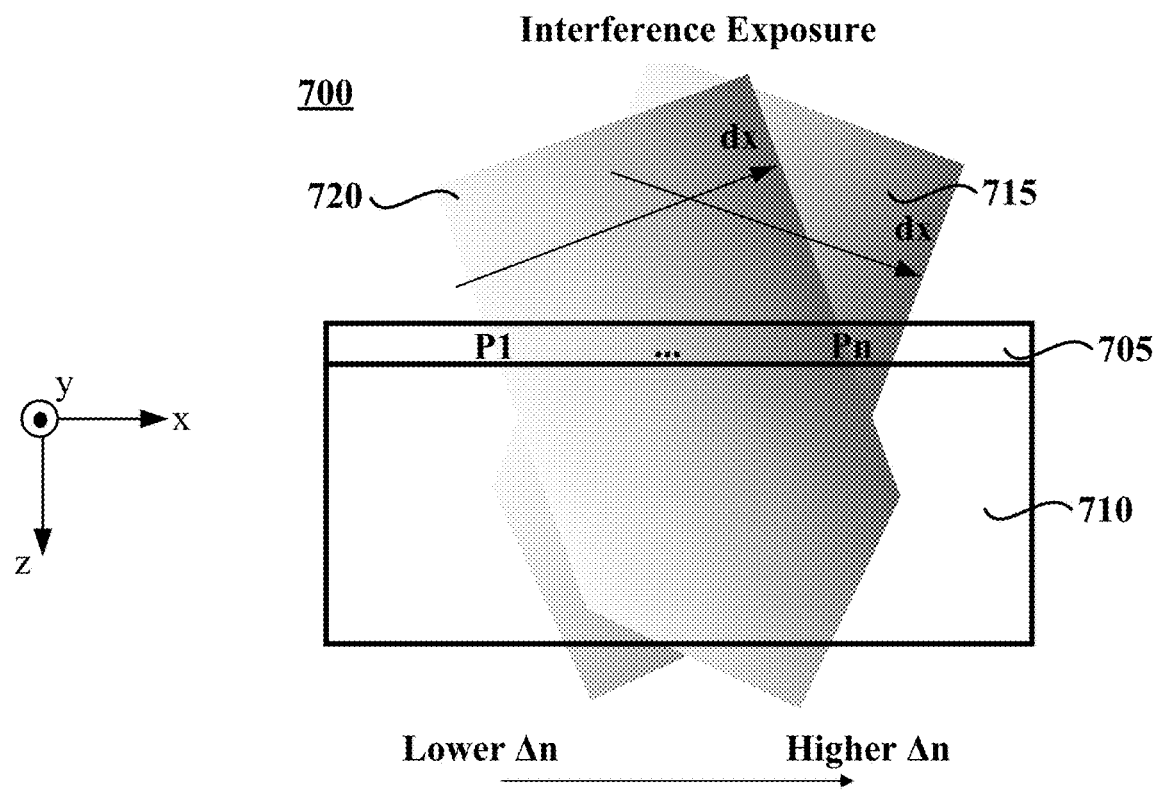
FIG. 7A illustrates an interference exposure of a M1 film to obtain a PVH grating having a birefringence gradient, according to an embodiment of the present discourse.
Figure 7B:
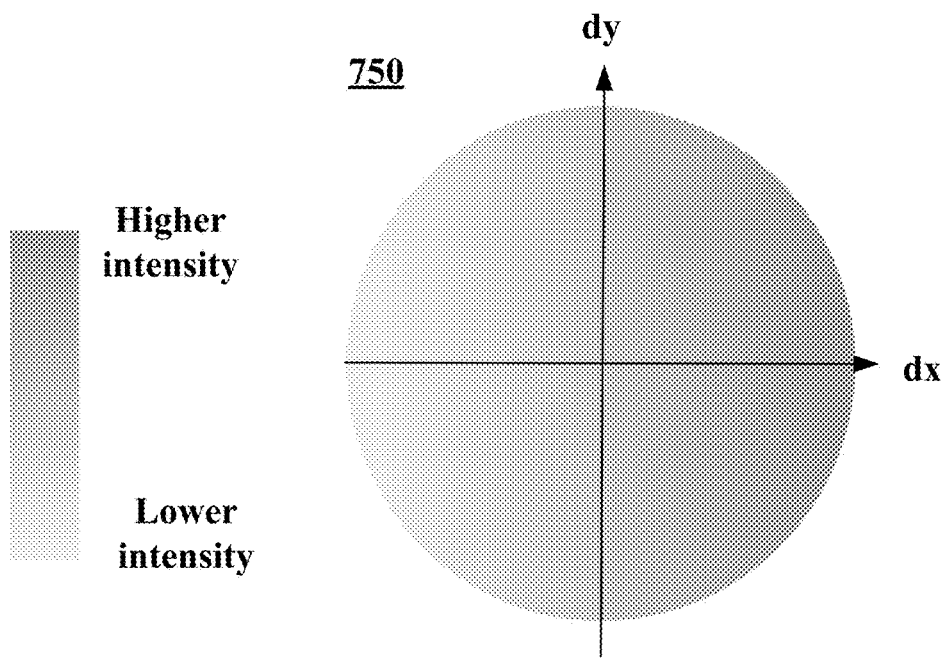
FIG. 7B illustrates a spatial intensity profile of a beam used for the interference exposure in FIG. 7A, according to an embodiment of the present discourse.

In some embodiments, the PVH 605 having a birefringence gradient in a predetermined direction at the plane of the PVH may be obtainable by a gradient exposure of a M1 film, such as varying the exposure intensity and/or exposing time of a M1 film along the predetermined direction. FIG. 7A illustrates an interference exposure 700 of a M1 film 705 to obtain a PVH having a birefringence gradient in a predetermined direction at the plane of the PVH according to an embodiment of the present discourse. FIG. 7B illustrates a spatial intensity profile 750 of beam 715 or 720 that may be used in the interference exposure 700 in FIG. 7A. FIG. 7A and FIG. 7B illustrate a PVH having a birefringence gradient in a predetermined direction at the plane of the PVH may be obtainable by varying the exposure intensity of a M1 film along the predetermined direction.

As shown in FIG. 7A, a solution of M1 in a solvent (e.g., chloroform (CHCl3)) may be dispensed (e.g., spin coated) on a substrate 710 to form the M1 film 705. Two polarized beams, e.g., opposite-handed circularly polarized beams 715 and 720 (e.g., UV or violet light beams) may be aligned in an angle α to generate an interference pattern recorded at the M1 film 705. The interference pattern may have an intensity gradient vector along a first predetermined direction at a plane of the M1 film 705, for example, +x-axis direction in FIG. 7A. In some embodiments, the interference pattern having the intensity gradient vector along the first predetermined direction may be obtainable by configuring each of the two polarized beams 715 and 720 to have an intensity gradient vector along a beam diameter direction, e.g., +dx direction in FIG. 7A. It is to be noted that the beam diameter direction is defined within a local coordinate system of each beam. For each beam 715 or 720, the beam diameter direction (e.g., +dx direction in FIG. 7A) may be oriented relative to the first predetermined direction (e.g., +x-axis direction in FIG. 7A), such that the projection of the beam diameter direction onto the plane of the M1 film 705 may be parallel to the first predetermined direction. After the exposure, the exposed M1 film may be annealed at an elevated temperature corresponding to LC mesophase of M1. In some embodiments, a desired thickness of PVH may be realized by changing solution concentration and/or spinning velocity.

As shown in FIG. 7B, the spatial intensity profile 750 of the beam 715 or 720 is represented by a circle with a gradient fill, where the darker color indicates the higher beam intensity. The spatial intensity profile 750 of the beam 715 or 720 shows an intensity gradient vector along the beam diameter direction +dx, e.g., the beam intensity gradually increases along the beam diameter direction +dx. The beam diameter direction +dx may be perpendicular to a light propagating direction of the beam. The spatial intensity profile 750 of the beam 715 or 720 shown in FIG. 7B may be obtainable by shaping a spatial intensity profile of each beam using beam shaping technologies, e.g., filters (masks) with the transparency gradient, such that each beam after beam shaping may have an intensity gradient vector along the beam diameter direction.

Referring to FIG. 7A and FIG. 7B, a gradient vector of the intensity of the interference pattern may determine a gradient vector of the photoinduced birefringence of the M1 film 705, which in turn determines a gradient vector of the birefringence of the fabricated PVH and, accordingly, a gradient vector of the diffraction efficiency of the fabricated PVH. In some embodiments, the gradient vector of the intensity of the interference pattern, the gradient vector of the photoinduced birefringence of the M1 film 705 exposed to the interference pattern, and the gradient vector of the diffraction efficiency of the fabricated PVH may point to a same direction, e.g., +x-axis direction in FIG. 7A. In some embodiments, the gradient vector of the intensity of the interference pattern may point to a direction, e.g., −y-axis direction in FIG. 7A, while the gradient vector of the photoinduced birefringence of the M1 film 705 exposed to the interference pattern, and the gradient vector of the diffraction efficiency of the fabricated PVH may point to a same opposite direction, e.g., +x-axis direction in FIG. 7A. Through configuring an appropriate intensity gradient of the interference pattern at the M1 film 705 in the +x-axis direction, the photoinduced birefringence Δnp of the M1 film may gradually increase along the +x-axis direction.

Referring to FIG. 7A, the M1 film 705 may be divided into a plurality of portions P1, P2, P3 . . . Pn−1, Pn arranged along the +x-axis direction, where n is a positive integer. The exposure intensity of the respective portions P1, P2, P3 . . . Pn−1, Pn may be individually or collaboratively controlled. It is to be noted that, dividing the M1 film 705 into the portions P1, P2, P3 . . . Pn−1, Pn is only for illustrative purposes, the exposure intensity at the M1 film 705 indeed changes continuously. That is, the size of the respective portions P1, P2, P3 . . . Pn−1, Pn may be substantially small, such that the exposure intensity at the M1 film 705 changes continuously from the portion P1 to the portion Pn. For illustrative purposes, FIG. 7A shows the exposure intensity of at the M1 film 705 may be configured to gradually increase from the portion P1 to the Portion Pn along the +x-axis direction, through which the photoinduced birefringence of the M1 film 705 or the birefringence of the fabricated PVH may gradually increase along the +x-axis direction. In some embodiments, the exposure intensity of at the M1 film 705 may be configured to gradually decrease from the portion P1 to the Portion Pn along the +x-axis direction, through which the photoinduced birefringence of the M1 film 705 or the birefringence of the fabricated PVH may gradually increase along the +x-axis direction. Thus, the diffraction efficiency of a PVH grating including the fabricated PVH may gradually increase along the +x-axis direction, i.e., the diffraction efficiency gradient vector may be along the +x-axis direction. When the PVH grating is implemented into the waveguide display assembly shown in FIGS. 2-3, the diffraction efficiency gradient vector of the PVH grating may be oriented parallel to a desired pupil-expanding direction of the waveguide display assembly, such that a uniform illuminance over the desired expanded exit pupil may be realized.

Figure 8A:
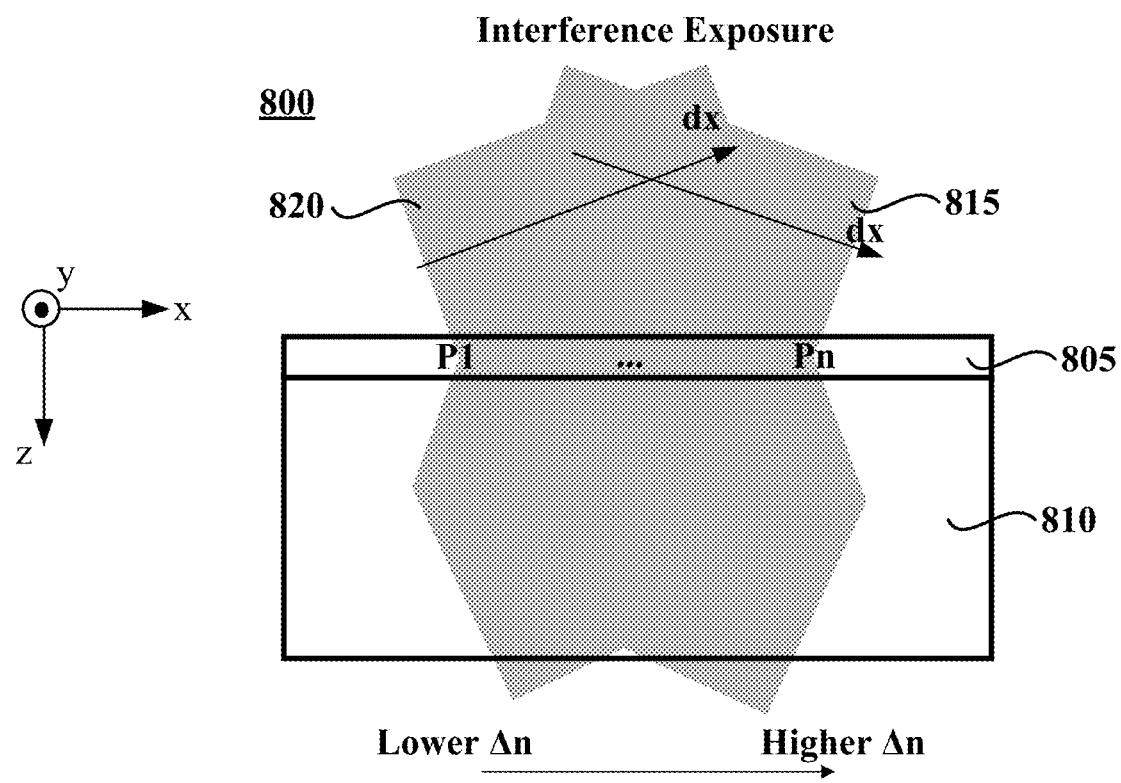
FIG. 8A illustrates an interference exposure of an M1 film to obtain a PVH grating having a birefringence gradient, according to another embodiment of the present discourse.
Figure 8B:
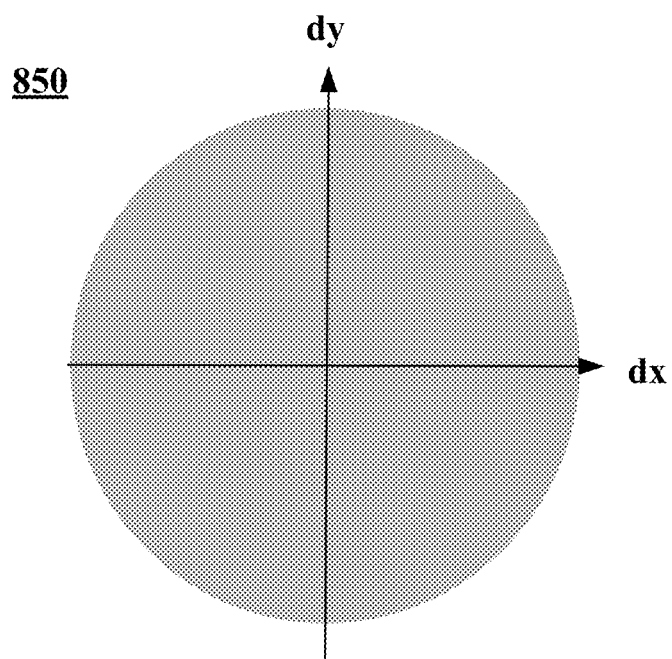
FIG. 8B illustrates a spatial intensity profile of a beam used for the interference exposure in FIG. 8A, according to an embodiment of the present discourse.

FIG. 8A illustrates another interference exposure 800 of a M1 film 805 to obtain a PVH having a photoinduced birefringence gradient according to an embodiment of the present discourse. The similarities between FIG. 7A and FIG. 8A are not repeated, while certain differences may be explained. As shown in FIG. 8A, the M1 film 805 may be spin coated on a substrate 810 and subjected to an interference exposure generated by two coherent polarized beams, e.g., two opposite-handed circularly polarized beams 815 and 820. The two circularly polarized beams 815 and 820 may have a substantially uniform spatial intensity profile, as shown in FIG. 8B. A birefringence gradient across the PVH in a first predetermined direction in a plane of the PVH (e.g., +x-axis direction in FIG. 8A) may be attainable by varying the exposure time of the M1 film 805 in the first predetermined direction.

For illustrative purposes, the M1 film 805 in FIG. 8A may be divided into a plurality of portions P1, P2, P3 . . . Pn−1, Pn arranged along the +x-axis direction, where n is a positive integer. The exposure time of the portions P1, P2, P3 . . . Pn−1, Pn may be individually or collaboratively controlled. In some embodiments, the exposure time of the M1 film 805 may gradually increase from the portion P1 to the portion Pn. For example, referring to the curve 420 in FIG. 4 and FIG. 8A, the exposure time of the portions P1, P2, P3 . . . Pn−1, Pn may gradually increase from 2 mins to 10 mins in sequence, through which the photoinduced birefringence of the M1 film 805 or the birefringence of the fabricated PVH may gradually increase along the +x-axis direction. In some embodiments, the exposure time of the portions P1, P2, P3 . . . Pn−1, Pn may gradually decrease.

For example, referring to the curve 420 in FIG. 4 and FIG. 8A, the exposure time of the portions P1, P2, P3 . . . Pn−1, Pn may gradually decrease from about 25 mins to 15 mins in sequence, through which the photoinduced birefringence of the M1 film 805 or the birefringence of the fabricated PVH may gradually increase along the +x-axis direction. Thus, the diffraction efficiency of a PVH grating including the fabricated PVH may gradually increase along the +x-axis direction, i.e., the diffraction efficiency gradient vector may be along the +x-axis direction. When the PVH grating is implemented into the waveguide display assembly shown in FIGS. 2-3, the diffraction efficiency gradient vector of the PVH grating may be oriented parallel to a desired pupil-expanding direction of the waveguide display assembly, such that a uniform illuminance over the desired expanded exit pupil may be realized.

Figure 9:
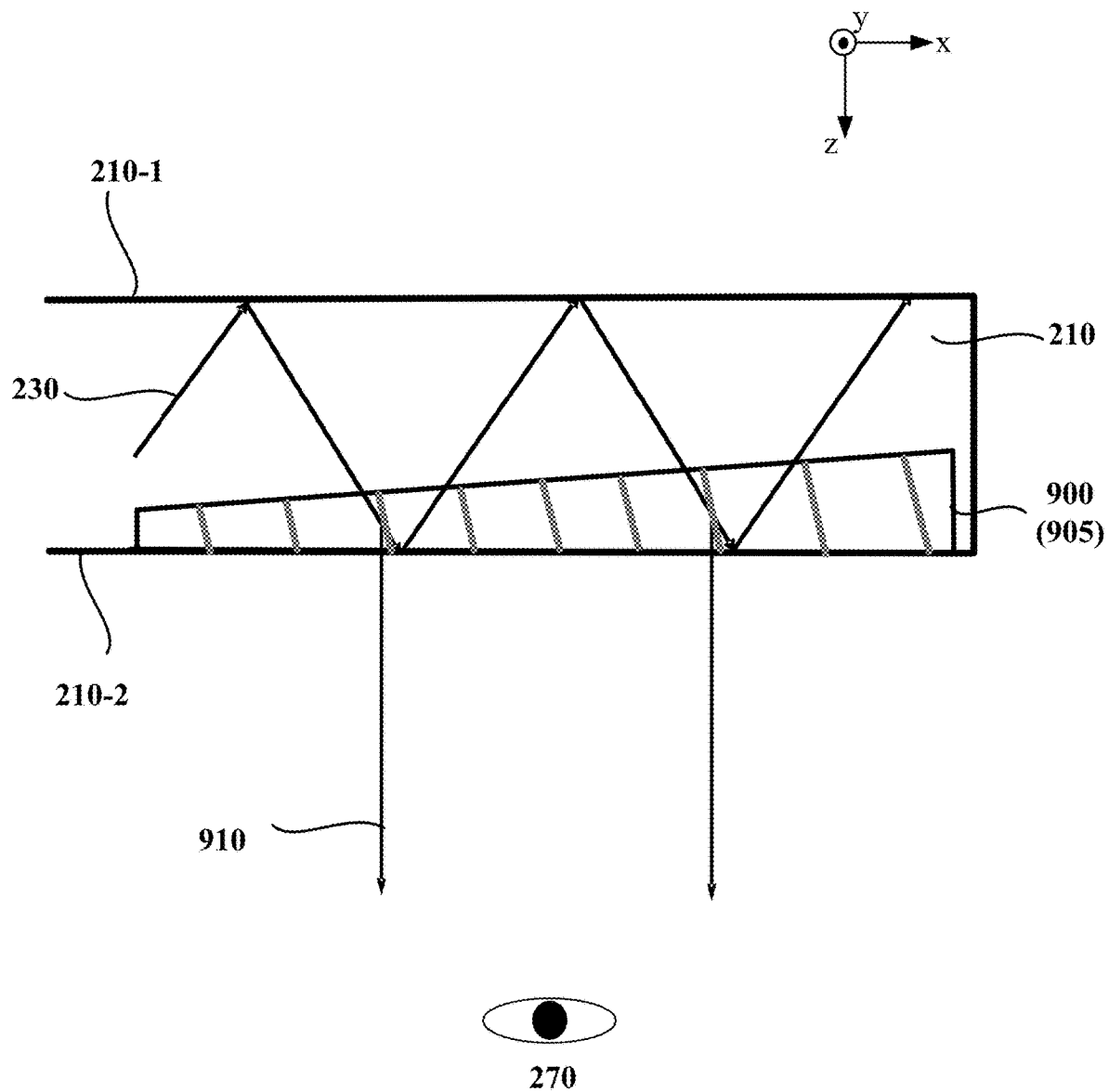
FIG. 9 illustrates a schematic diagram of a PVH grating having a diffraction efficiency gradient implemented in a waveguide display assembly, according to another embodiment of the present disclosure.

FIG. 9 illustrates a schematic diagram of another PVH grating 900 implemented into a waveguide display assembly according to an embodiment of the present disclosure. The PVH grating 900 may be an embodiment of the out-coupling element 245 in FIG. 2. The diffraction efficiency gradient vector of the PVH grating 900 may be orientated to be along a desired pupil-expanding direction, e.g., +x-axis direction in FIG. 2 and FIG. 9, which may be attainable by orienting a PVH birefringence gradient vector along the pupil-expanding direction because the diffraction efficiency gradient vector is determined by the PVH birefringence gradient vector. For easy description, FIG. 9 only shows partial structure of the waveguide display assembly, and the detail structure of the waveguide display assembly can be referred to FIGS. 2-3.

As shown in FIG. 9, the PVH grating 900 may include a transmissive PVH 905 fabricated from the material M1. In some embodiments, the PVH grating 900 may be the PVH 905. The PVH 905 may have a uniform birefringence. The film thickness of the PVH 905 may gradually increase in a predetermined direction at a plane of the PVH 905 and, accordingly, the diffraction efficiency gradient vector of the PVH grating 900 may be in the predetermined direction. The diffraction efficiency gradient vector of the PVH grating 900 may be orientated relative to a desired pupil-expanding direction of the waveguide display assembly, such that a desired direction of pupil expansion with a uniform illuminance may be provided. In some embodiments, the diffraction efficiency gradient vector of the PVH grating 900 may be orientated parallel to a desired pupil-expanding direction of the waveguide display assembly, e.g., the desired pupil-expanding direction is in +x-axis direction in FIG. 9. That is, when the film thickness of the PVH 905 gradually increases along the pupil-expanding direction, the diffraction efficiency of the PVH grating 900 may increase accordingly along the pupil-expanding direction of the waveguide display assembly. Thus, the luminance decrease of extracted light 910 via diffraction along the pupil-expanding direction may be compensated, and a uniform illuminance over the expanded exit pupil may be realized accordingly. That is, a uniform image brightness throughout may be achieved over the expanded exit pupil, and the user may observe images with uniform brightness.

Figure 10:
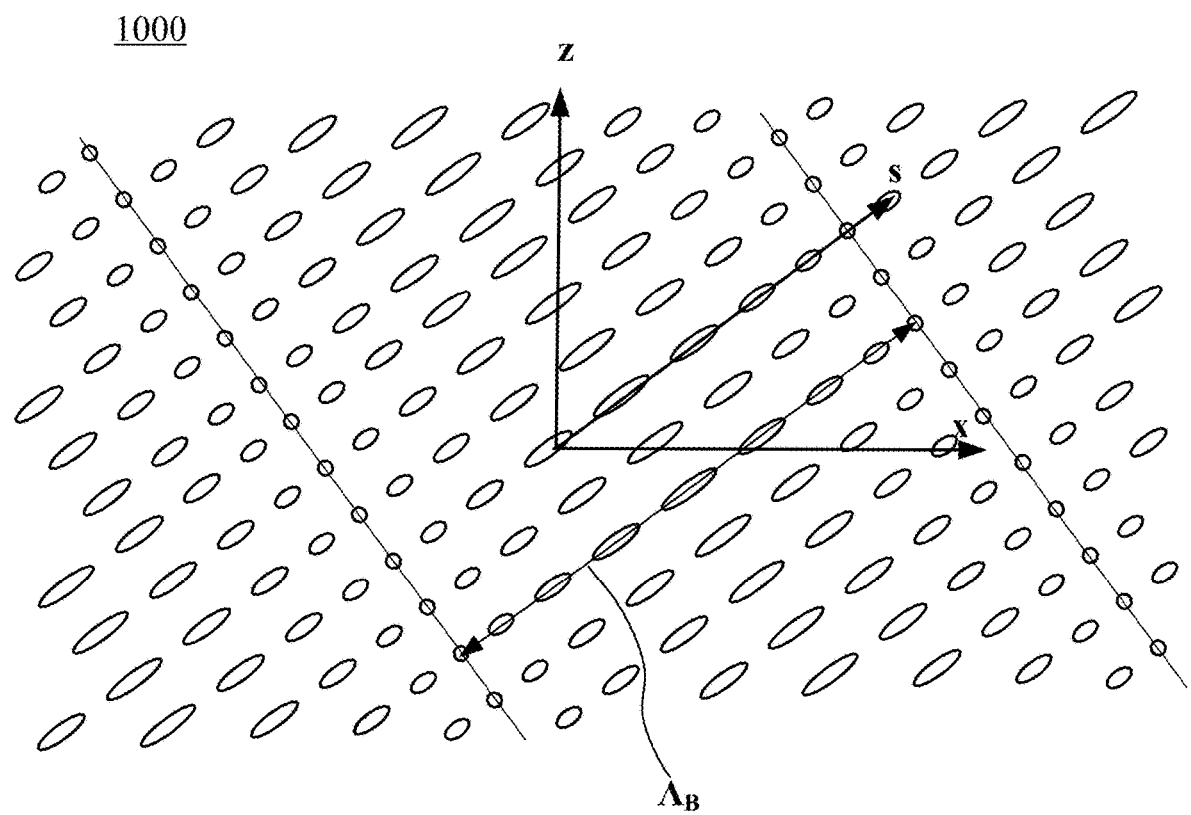
FIG. 10 illustrates a cross-sectional view of a PVH grating, according to an embodiment of the present disclosure.

FIG. 10 illustrates a PVH 1000, which may be an embodiment of the PVH 605 in FIG. 6 and an embodiment of the PVH 905 in FIG. 9. The PVH 1000 may be fabricated from the material M1. FIG. 10 is a cross-sectional view of the PVH 1000 in the x-z plane, where z-direction is the thickness direction of the PVH 1000. The optical function of the PVH 1000 may be determined based on the manipulation of long molecular axes of the mesogenic groups in the M1 film that is used as a recoding layer subjected to the interface exposures. In the M1 film, the mesogenic groups may be side polymer chains, and an orientation of the long molecular axes of the mesogenic groups is also referred to as an orientation or alignment of the mesogenic groups. The alignment of the mesogenic groups in the M1 film may have 3D alignment patterns, which may be formed according to 3D patterns of light polarization formed in result of interference of two light beams with orthogonal circular polarization, for example, as shown in FIG. 7A or FIG. 8A. The distance between neighboring slanted lines is the Bragg period AB of the PVH grating formed by the material M1.

It is to be noted that, for illustrative purposes, FIG. 6, FIG. 9 and FIG. 10 show transmissive PVH gratings having a diffraction efficiency gradient along a predetermined direction in a plane of the PVH. After implemented into the waveguide display assembly, the diffraction efficiency gradient vector of the PVH grating may be oriented to be parallel to a desired pupil-expanding direction of the waveguide display assembly, e.g., +x-axis direction in FIG. 2 and FIG. 3, such that the uniform image brightness throughout over the desired expanded exit pupil may be achieved. In some embodiments, slanted reflective PVH gratings having a diffraction efficiency gradient along a predetermined direction in a plane of the PVH may also be configured and implemented into the waveguide display assembly to achieve the uniform image brightness throughout over the expanded exit pupil. In some embodiments, the slanted reflective PVH gratings may be formed in liquid crystalline polymers of M series with chiral dopant or other liquid crystal materials with chiral dopant aligned by the alignment surface with the polarization grating patterns.

Liquid crystalline polymers of M series with cinnamate photosensitive chains are only used to demonstrate an exemplary recording of the PVH grating in accordance with an embodiment of the present disclosure. However, other classes of liquid crystalline materials suitable for recording PVHs (e.g., azopolymers, etc.) may be also used. In some embodiments, the PVH grating in accordance with an embodiment of the present disclosure may also be recorded in amorphous polymers, such as poly(vinyl cinnamate). In addition, PVH is only one example of the gratings that may be configured with a diffraction efficiency gradient along a predetermined direction at a plane of the grating, and a projection of the grating vector on the plane of the grating (that determines a diffraction efficiency gradient vector of the grating) may be oriented to be parallel to a desired pupil-expanding direction of the waveguide display assembly. The diffraction efficiency gradient may also be induced to holographic optical element (HOE) and other types of gratings, which is not limited by the present discourse. In the waveguide display assembly, a waveguide merely with in-coupling and out-coupling gratings may be used to provide a 1D pupil expansion. In some embodiments, the waveguide may contain additional gratings, for example a folding grating to change light propagation in the waveguide and provide a 2D pupil expansion.

The foregoing description of the embodiments of the disclosure have been presented for the purpose of illustration. It is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A device, comprising:
   a display configured to generate an image light; and
   a waveguide optically coupled with the display and configured to guide the image light to an exit pupil of the device,
   wherein the waveguide comprises a grating including a birefringent material, and a birefringence of the grating is configured to increase along a pupil-expanding direction of the device.

2. The device of claim 1, wherein a projection of a grating vector of the grating on a plane perpendicular to a thickness direction of the grating is configured to be parallel with the pupil-expanding direction.

3. The device of claim 1, wherein the grating includes a transmissive polarization volume hologram.

4. The device of claim 1, wherein the grating includes a reflective polarization volume hologram.

5. The device of claim 1, wherein a thickness of the grating is configured to vary along the pupil-expanding direction.

6. The device of claim 5, wherein the thickness of the grating is configured to increase along the pupil-expanding direction.

7. The device of claim 1, wherein a diffraction efficiency of the grating is configured to increase along the pupil-expanding direction.

8. A device, comprising:
a display configured to generate a first image light; and
a waveguide optically coupled with the display and comprising:
an in-coupling element configured to couple the first image light into the waveguide as a second image light that propagates inside the waveguide via total internal reflection; and
an out-coupling element configured with a predetermined diffraction efficiency gradient along a pupil-expansion direction of the device,
wherein as the second image light propagates inside the waveguide via total internal reflection, the out-coupling element is configured to diffract, in the predetermined diffraction efficiency gradient, the second image light incident onto a plurality of portions of the out-coupling element with the same incidence angle out of the waveguide as a plurality of parallel third image lights,
wherein the out-coupling element includes a birefringent material, and is configured with a predetermined birefringence gradient along the pupil-expansion direction.

9. The device of claim 8, wherein the predetermined diffraction efficiency gradient is configured to increase along the pupil-expansion direction.

10. The device of claim 8, wherein the predetermined birefringence gradient is configured to increase along the pupil-expansion direction.

11. The device of claim 8, wherein the out-coupling element includes a birefringent material, and is configured with a predetermined thickness gradient along the pupil-expansion direction.

12. The device of claim 8, wherein the out-coupling element includes a transmissive polarization volume hologram.

13. The device of claim 8, wherein the out-coupling element includes a reflective polarization volume hologram.

14. A device, comprising:
a display configured to generate a first image light; and
a waveguide optically coupled with the display and comprising:
an in-coupling element configured to couple the first image light into the waveguide as a second image light that propagates inside the waveguide via total internal reflection; and
an out-coupling element configured with a predetermined diffraction efficiency gradient along a pupil-expansion direction of the device,
wherein as the second image light propagates inside the waveguide via total internal reflection, the out-coupling element is configured to diffract, in the predetermined diffraction efficiency gradient, the second image light incident onto a plurality of portions of the out-coupling element with the same incidence angle out of the waveguide as a plurality of parallel third image lights,
wherein the out-coupling element includes a birefringent material, and is configured with a predetermined thickness gradient along the pupil-expansion direction, and
wherein the predetermined thickness gradient is configured to increase along the pupil-expansion direction.

15. The device of claim 14, wherein the out-coupling element includes a transmissive polarization volume hologram.

16. The device of claim 14, wherein the out-coupling element includes a reflective polarization volume hologram.

* * * * *